US007520041B1

(12) United States Patent
Aguilar

(10) Patent No.: US 7,520,041 B1
(45) Date of Patent: Apr. 21, 2009

(54) QUILL SHAFT EXTRACTOR FOR THE 700 SERIES AIRCRAFT

(76) Inventor: David B Aguilar, 2741 W. Partridge, Tucson, AZ (US) 85746

(*) Notice: Subject to any disclaimer, the term of this patent is extended or adjusted under 35 U.S.C. 154(b) by 10 days.

(21) Appl. No.: 11/702,050

(22) Filed: Aug. 9, 2007

Related U.S. Application Data

(60) Provisional application No. 60/779,388, filed on Mar. 3, 2006.

(51) Int. Cl.
*B23P 19/04* (2006.01)

(52) U.S. Cl. ............................ 29/259; 29/270; 29/255; 29/278

(58) Field of Classification Search .................. 29/259, 29/255, 244, 263, 264, 278, 270
See application file for complete search history.

(56) References Cited

U.S. PATENT DOCUMENTS 4,034,458 A * 7/1977 Ford et al. .................... 29/259
5,033,180 A * 7/1991 Colson ........................ 29/259
5,894,650 A * 4/1999 Barenburg .................... 29/259
6,266,859 B1 * 7/2001 Hernandez .................... 29/256
6,665,918 B1 * 12/2003 Williams ..................... 29/259
6,886,228 B1 * 5/2005 Chen .......................... 29/263
7,322,087 B1 * 1/2008 Hu ............................. 29/261
2006/0137160 A1 * 6/2006 Chung et al. .................. 29/259

* cited by examiner

*Primary Examiner*—Lee D Wilson

(57) ABSTRACT

An extractor tool used to remove the quill shaft unique to the General Electric T-700 series turboshaft engine when used as the powerplant for the AH-64A & D model Apache Helicopters. The extractor incorporates an alignment housing coupled with an extractor unit. The alignment unit consists of a top plate with alignment holes for the 2 pullers as well as a bottom plate that has mounting holes unique to the T-700 turboshaft engine with both plates held together by spacer sleeves. The extractor unit incorporates a threaded shaft with a machined point that is threaded through a crossbar. The crossbar holds 2 individual jaws that slide onto the crossbar and are used to grasp and remove the quill shaft when the quill shaft is mounted in the T-700 Series engine and installed for use as the primary powerplant in the AH-64A & D model Apache Helicopters.

4 Claims, 1 Drawing Sheet

QUILL SHAFT EXTRACTOR FOR THE 700 SERIES AIRCRAFT

RELATED APPLICATIONS

This application claims priority from a U.S. Provisional Patent Application PTO 60/779,388, filed on Mar. 3, 2006.

FIELD OF THE INVENTION

The Quill Shaft Extractor for the 700 Series Aircraft is designed to facilitate the safe and efficient extraction of a quill shaft from an Apache Aircraft.

BACKGROUND OF THE INVENTION

The method currently in use to perform the task of removing a Quill Shaft from the engine of an Apache Aircraft requires more then one mechanic and is considered a job that require alertness and caution. The Quill Shaft Extractor for the 700 Series Aircraft is relatively simple to manufacture and use. The current removal method of extracting the Quill Shaft requires two to three personnel in order to remove the Quill Shaft. It has also taken as long as one to five hours to remove the shaft depending how dry the O-rings on the shaft are. TM-1-11520-238-23 par 6.36 Item K states:

1. Pull shaft (23) straight out to remove from engine (22)
2. Remove and discard three packings (24) and packing (25) from shaft
3. Procedure for removing shaft are;
   - (a) strap a sling or a rope to the quill shaft
   - (b) tie the sling or rope to a wooden 2×4
   - (c) at this time you are ready to start pulling the quill shaft out, using the nose gear box fiber glass cover for leverage to pry the shaft out There are two main problems with this method:

1. Safety Hazard;
   - (a) The engine gear box is located about 8 to 9 feet above the ground level. You must make sure that your footing is secure to safe guard from a fall and a potential injury.
   - (b) If there is not a good grip on the quill shaft once the quill shaft releases it could fall to the ground and break the shaft of hit someone on the ground causing a potential injury.
   - (c) Employees have had back injuries from pulling out the quill shaft.
2. Loss of time and money
   - (a) This method requires two to three employees for one to five hours time to pull out the quill shaft.
   - (b) Should there be an injury from a fall, strained back or from being hit by a dropped object this will cause loss of work for the employees and their medical bills.
   - (c) Should the quill shaft fall to the ground and break you lose the time spent pulling the quill shaft out and the money it takes to replace the quill shaft.

Upon removing the engine gear nose box from the engine we have realized that many quill shafts have been jammed in place. This is due to heat expansion and other dynamics. To remove the shaft from the engines is the issue. One must grasp the quill shaft splined edges and pull from a position on the Armament wing, 8 to 9 feet off of the ground. The mechanic can lightly tap on the shaft with a dead blow hammer and attempt to loosen it, but mainly it takes a series of good hard pulls and some luck to remove the quill shaft from the engine. The Quill Shafter Extractor has significantly reduced the time required to remove the shaft and considerably reduced the exposure to injury to the employee. Additionally by utilizing the quill Shaft Extractor it reduces the chances for damage to the quill shaft, the engine and the airframe. Typically on most engine types, there are components that must be released from their lodging through the use of an extractor or other pull-type implement. These tools are an essential part of any mechanics tools and equipment.

SUMMARY OF THE INVENTION

The present invention relates to an extractor tool used to remove the quill shaft unique to the General Electric T-700 series turboshaft engine when used as the powerplant for the AH-64A & D model Apache Helicopters.

The extractor incorporates an alignment housing coupled with an extractor unit. The alignment unit consists of a top plate with alignment holes for the two pullers as well as a bottom plate that has mounting holes unique to the T-700 turboshaft engine with both plates held together by spacer sleeves. The extractor unit incorporates a threaded shaft with a machined point that is threaded through a crossbar. The crossbar holds two individual jaws that slide onto the crossbar and are used to grasp and remove the quill shaft when the quill shaft is mounted in the T-700 Series engine and installed for use as the primary powerplant in the AH-64A & D model Apache Helicopters.

The primary object of the present invention is to provide an extraction tool to remove the primary output driveshaft (quillshaft) from the General Electric T-700 series turbo shaft engine when used as the primary power plant in the AH-64 Apache Helicopter.

BRIEF DESCRIPTION OF THE DRAWING

The Quill Shaft Extractor for the 700 Series Aircraft consists of a single unit made of metal, preferably one quarter inch aluminum. The product is four and three-eighths inches high and has a length of six and three-eighths inches long ands wide. The overall design creates a shaft housing unit with a shaft extractor. The extractor unit fits directly over a specific location in the targeted engine. This finds it aligned over a set of 15 securing holes. It is bolted down in this position. At this point, the extractor unit would be lowered and allowed to grip the quill shaft. Turning the extractor allows the quill shaft to be loosened from its moorings and raised as needed. FIGS. 1 and 2 show the present invention. The third drawing shows a third figure which is a drawing of an aircraft and its working parts.

THE DETAILED DESCRIPTION OF THE INVENTION

Figure 2:
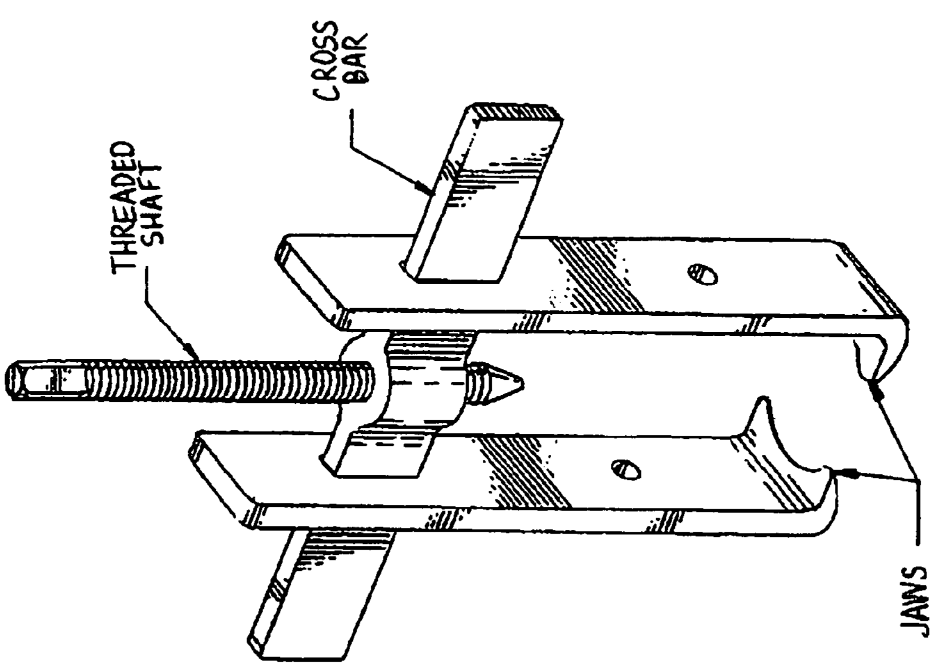
FIG. 2 is a drawing of a top plate, slots, bolt, spacer sleeve, holes, and bottom plate.
Figure 1:
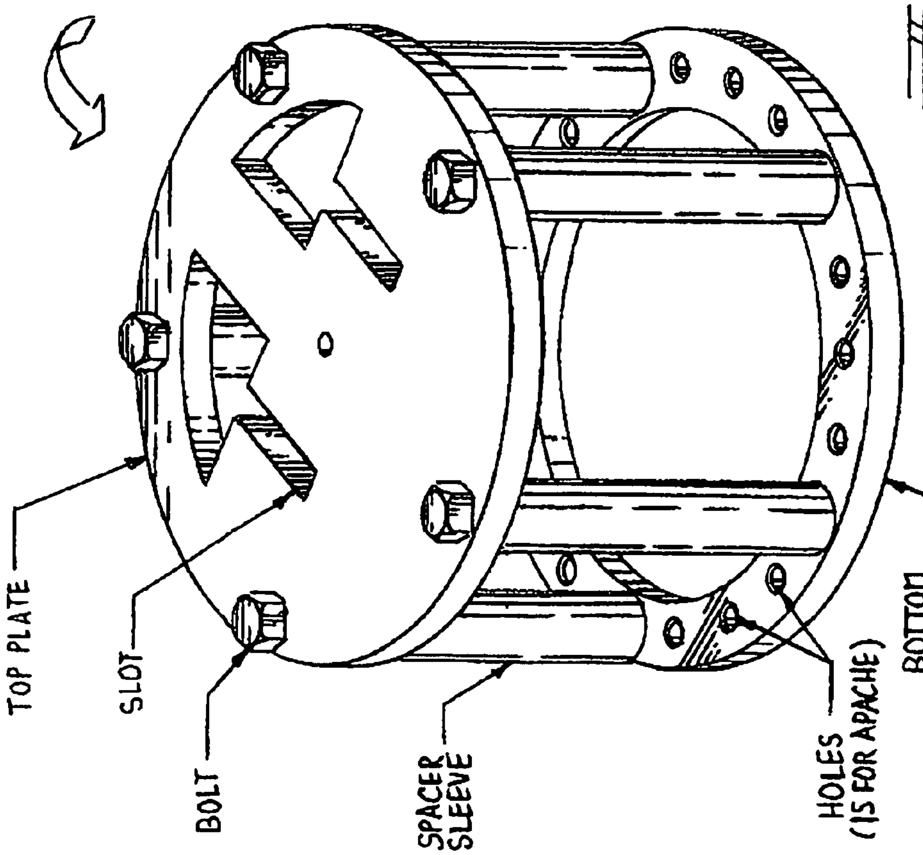
FIG. 1 is a drawing of a threaded shaft, cross bar, and jaws.

The present invention relates to an extractor tool used to remove the quill shaft unique to the General Electric T-700 series turboshaft engine when used as the powerplant for the AH-64A & D model Apache Helicopters.

The extractor incorporates an alignment housing coupled with an extractor unit. The alignment unit consists of a top plate with alignment holes for the two pullers as well as a bottom plate that has mounting holes unique to the T-700 turboshaft engine with both plates held together by spacer sleeves. The extractor unit incorporates a threaded shaft with a machined point that is threaded through a crossbar. The crossbar holds two individual jaws that slide onto the crossbar and are used to grasp and remove the quill shaft when the quill shaft is mounted in the T-700 Series engine and installed for use as the primary powerplant in the AH-64A & D model Apache Helicopters.

The primary object of the present invention is to provide an extractor tool for removing the primary output driveshaft from the Apache General Electric T-700 series turbo shaft engine.

A puller and stand in combination for removing quill shafts from an engine and said combination of said puller and stand comprising: an puller having an elongated cross bar with a threaded aperture in a center of said bar; a threaded shaft translating through said threaded aperture; a pair of L-shaped jaws with a slot for said cross bars and perpendicular facing jaws on each of said L-shaped jaws with a central cut out shaped portion in between said jaws; and a stand having top plate with parallel slots connected each to arch shaped openings; cylindrical spaces sleeves in between the said top plate and a bottom plate having a circular holes forming a ring with cylindrical spacer sleeves connect through a plurality of apertures.

The puller and stand combination has the top plate having holes and fasteners passing through said holes attaching said cylindrical spacer sleeves. THe stand of said combination has the bottom plate having holes and fasteners passing through said holes attaching said cylindrical spacer sleeves. The stand of said combination has the top plate having two elongated sides forming a right angle with the arccurate side connecting to each end and the slot forming an rectangular opening at bottom of one of the said sides.

CONCLUSION

The Quill Shaft Extractor for the 700 Series Aircraft could save many man hours and thousands of dollars in the Aircraft Industry by implementing this tool to remove the quill shaft. By using the Quill Shaft Extractor could also reduces injuries received by employees using the current method of removing the quill shaft. The dimensions for this extractor are for the 700 Series Aircraft but by adjusting the measurements larger or smaller it could also be used on larger or smaller engines as needed in the Aircraft Industry, which uses a quill shaft.

I claim:

1. A puller and stand in combination for removing quill shafts from an engine and said combination of said puller and stand comprising: an puller having an elongated cross bar with a threaded aperture in a center of said bar; a threaded shaft translating through said threaded aperture; a pair of L-shaped jaws with a slot for said cross bars and perpendicular facing jaws on each of said L-shaped jaws with a central cut out shaped portion in between said jaws; and a stand having top plate with parallel slots connected each to arch shaped openings; cylindrical spaces sleeves in between the said top plate and a bottom plate having a circular holes forming a ring with cylindrical spacer sleeves connect through a plurality of apertures.

2. The puller and stand in combination of claim 1, wherein said stand of said combination has the top plate having holes and fasteners passing through said holes attaching said cylindrical spacer sleeves.

3. The puller and stand in combination of claim 1, wherein said stand of said combination has the bottom plate having holes and fasteners passing through said holes attaching said cylindrical spacer sleeves.

4. The puller and stand in combination of claim 1, wherein said stand of said combination has the top plate having two elongated sides forming a right angle with the arccurate side connecting to each end and the slot forming an rectangular opening at bottom of one of the said sides.

* * * * *